US012377596B2

(12) United States Patent
Walter et al.

(10) Patent No.: US 12,377,596 B2
(45) Date of Patent: Aug. 5, 2025

(54) MIXING AND KNEADING MACHINE WITH A DISCHARGE DEVICE WHICH HAS A DEGASSING DEVICE

(71) Applicant: BUSS AG, Pratteln (CH)

(72) Inventors: Wolfgang Walter, Aalen (DE); Martin Schötzau, Augst (CH)

(73) Assignee: BUSS AG, Pratteln (CH)

( * ) Notice: Subject to any disclaimer, the term of this patent is extended or adjusted under 35 U.S.C. 154(b) by 899 days.

(21) Appl. No.: 17/051,736

(22) PCT Filed: Apr. 18, 2019

(86) PCT No.: PCT/EP2019/060209
§ 371 (c)(1),
(2) Date: Oct. 29, 2020

(87) PCT Pub. No.: WO2019/211109
PCT Pub. Date: Nov. 7, 2019

(65) Prior Publication Data
US 2021/0229336 A1    Jul. 29, 2021

(30) Foreign Application Priority Data

May 2, 2018    (EP) .................................... 18170447

(51) Int. Cl.
*B29C 48/385*    (2019.01)
*B29B 7/42*    (2006.01)
(Continued)

(52) U.S. Cl.
CPC ............ *B29C 48/385* (2019.02); *B29C 48/04* (2019.02); *B29C 48/345* (2019.02); *B29C 48/41* (2019.02);
(Continued)

(58) Field of Classification Search
CPC .. B29B 7/845; B29B 7/42; B29B 7/72; B29B 7/801; B29B 7/7461; B29B 7/7466;
(Continued)

(56) References Cited

U.S. PATENT DOCUMENTS 3,023,455 A * 3/1962 Geier ...................... B29B 7/423
425/DIG. 243
3,362,044 A * 1/1968 Irving .................... B29B 9/065
425/310
(Continued)

FOREIGN PATENT DOCUMENTS

AT        510263 A4    3/2012
AT        510263 B1    3/2012
(Continued)

OTHER PUBLICATIONS

International Search Report for corresponding PCT Application No. PCT/EP2019/060209 mailed Jul. 22, 2019.
(Continued)

*Primary Examiner* — Charles Cooley
(74) *Attorney, Agent, or Firm* — Wood, Phillips, Katz, Clark & Mortimer (57) ABSTRACT

A mixing and kneading machine for continuous preparation processes, such as for producing granules, extruded profiles, or molded articles, such as polymer granules, polymer extruded profiles, or polymer molded parts, having a feeding and mixing device (12) and a discharge device (14), wherein the feeding and mixing device includes a housing (18), a screw shaft (34), and a connecting element (24), wherein the connecting element is arranged at a front side of the housing and is also connected to the discharge device, wherein a hollow interior is formed in both the housing and the connecting element, and the screw shaft extends, at least sectionally, in the axial direction through the interior of the housing and, at least sectionally, in the axial direction (Continued)

through the interior of the connecting element, and wherein a plurality of kneading elements (40), which extend from the inner circumferential surface of the housing into the interior, are provided in the housing, and wherein kneading elements (40) are also arranged on the inner circumferential surface of the connecting element and extend into the interior of the connecting element, and the discharge device has a degassing device (26).

15 Claims, 6 Drawing Sheets

(51) Int. Cl.
| | |
|---|---|
| *B29B 7/48* | (2006.01) |
| *B29B 7/84* | (2006.01) |
| *B29C 48/04* | (2019.01) |
| *B29C 48/345* | (2019.01) |
| *B29C 48/41* | (2019.01) |
| *B29C 48/76* | (2019.01) |

(52) U.S. Cl.
CPC ............ *B29C 48/767* (2019.02); *B29B 7/422* (2013.01); *B29B 7/487* (2013.01); *B29B 7/845* (2013.01)

(58) Field of Classification Search
CPC ........... B29B 7/48; B29B 7/422; B29B 7/487; B29C 48/2552; B29C 48/268; B29C 48/385; B29C 48/76; B29C 48/767; B29C 48/687
USPC ...................................... 366/75, 80
See application file for complete search history.

(56) References Cited

U.S. PATENT DOCUMENTS

| | | | | |
|---|---|---|---|---|
| 3,458,894 A | | 8/1969 | Wheeler | |
| 3,595,533 A | * | 7/1971 | Sutter ...................... | B29B 7/826 425/173 |
| 4,063,718 A | * | 12/1977 | Koch ...................... | B29C 48/76 366/75 |
| 4,127,372 A | * | 11/1978 | Perla ...................... | C11D 13/08 425/382.3 |
| 4,347,003 A | * | 8/1982 | Anders ................... | B29C 48/55 366/77 |
| 4,416,543 A | * | 11/1983 | Brinkmann ............. | B29C 48/38 366/288 |
| 4,484,878 A | * | 11/1984 | Anders ................... | B29C 48/92 366/75 |
| 4,746,478 A | * | 5/1988 | Fujisaki ............... | B29C 44/3442 366/280 |
| 4,764,020 A | * | 8/1988 | Moriyama .............. | B29B 7/487 366/85 |
| 5,200,204 A | * | 4/1993 | Horton ................ | B29C 48/6801 425/188 |
| 5,213,737 A | * | 5/1993 | Ford ....................... | B29C 48/04 264/109 |
| 5,378,415 A | * | 1/1995 | Gohlisch ............... | B29C 48/387 366/75 |
| 5,626,806 A | | 5/1997 | Holroyd et al. | |
| 5,804,111 A | | 9/1998 | Kobayashi et al. | |
| 5,908,592 A | * | 6/1999 | Kimura ................. | B29B 7/7461 366/75 |
| 6,652,257 B2 | * | 11/2003 | Yamaguchi ............. | B28B 3/206 425/467 |
| 6,709,147 B1 | | 3/2004 | Rauwendaal | |
| 2006/0034147 A1 | * | 2/2006 | Murakami ............. | B29C 48/76 366/75 |
| 2021/0229336 A1 | * | 7/2021 | Walter ..................... | B29B 7/60 |

FOREIGN PATENT DOCUMENTS

| | | | | |
|---|---|---|---|---|
| CH | 278575 A | 10/1951 | | |
| CH | 464656 | 10/1968 | | |
| DE | 2120601 A1 | 11/1972 | | |
| DE | 2924317 A1 | 12/1980 | | |
| DE | 4209179 C1 | 1/1993 | | |
| DE | 69212748 T2 | 1/1997 | | |
| EP | 0082494 A1 | 6/1983 | | |
| EP | 531957 A1 | 3/1993 | | |
| GB | 2052361 A | 1/1981 | | |
| GB | 2267092 A1 | 1/1981 | | |
| GB | 2084037 A | * | 4/1982 | ................ B01F 7/14 |
| IT | 910693 | 9/1991 | | |
| JP | 62023725 A | * | 1/1987 | ......... B29C 44/3442 |
| JP | 62056114 A | * | 3/1987 | ......... B29C 44/3442 |
| JP | H4-201228 A | 7/1992 | | |
| JP | H8-258115 A | 10/1996 | | |
| JP | 2000043032 A | * | 2/2000 | ......... B29C 47/1081 |
| JP | 2008-22893 A | 10/2008 | | |
| KR | 10-1998-0008506 | 4/1998 | | |
| KR | 10-2014-0079481 | 6/2014 | | |

OTHER PUBLICATIONS

Japanese Office Action for the corresponding Japanese Application No. 2020-561754 dated Mar. 14, 2023.
Chinese Office Action for the corresponding Chinese patent application dated Oct. 29, 2021.
Notice of Final Rejection for Korean Patent Application No. 10-2020-7034338 mailed Oct. 2, 2023.
Notice of Preliminary Rejection issued in the corresponding Korean Patent Application No. 10-2020-7034338 on Nov. 27, 2024.

* cited by examiner

MIXING AND KNEADING MACHINE WITH A DISCHARGE DEVICE WHICH HAS A DEGASSING DEVICE

The present invention relates to a mixing and kneading machine for continuous preparation processes having a feeding and mixing device, which comprises a housing, which borders a hollow interior, in which a rotating screw shaft moving in a preferably simultaneous translational manner is arranged, as well as having a discharge device, such as a discharge extruder.

Such mixing and kneading machines are used in particular for preparing plastic and/or viscous masses. For example, they are used for processing viscous plastic masses, homogenizing and plastifying plastics, working-in filler and reinforcing materials as well as the manufacturing of starting materials for the food industry. The screw shaft hereby forms the work element, which transports or conveys the material to be processed forward in an axial direction and thereby blends the components of the material together.

Such mixing and kneading machines are suited in particular for manufacturing polymer granulate, polymer extruded profiles, polymer molded parts and similar when a suitable discharge device, such as a discharge extruder, is used and the latter is connected to a granulation device or a similar device, such as to an intermittent cutting device, strand die, profile tool, sheet die, or a similar device. By means of the feeding and mixing device of the mixing and kneading machine, a homogeneous polymer melt or mixture (for example out of PVC, rubber, food, animal feed, powder coating, halogen-free flame retardants, pharmaceutical substances, etc.) is produced, which is then conveyed into the discharge device and by it to a granulation device, for example. For example, the individual components of the mixture are blended together and homogenized in the front section of the feeding and mixing device of the mixing and kneading machine, and out of the thus produced homogeneous mixture, a melt is produced (as long as at least one component of the mixture can be melted), wherein the same occurs in the middle and rear section of the feeding and mixing device. The thus produced melt is then conveyed through the discharge device for example to an underwater granulation device, in which the melt is pressed at 2 million pascals, for example, through the dies of a die plate and cut directly into granulate by rotating cutters upon exiting the die plate and solidified into granulate particles by process water flowing over the front side of the die plate. Alternatively, the melt or viscous mixture (if no melt is produced) can also be pressed through an extruder or molding tool to produce a polymeric molding.

The feeding and mixing devices of such mixing and kneading machines are known for example from CH 278 575 A as well as CH 464 656.

With regard to these mixing and kneading machines, the screw shaft of the feeding and mixing device preferably does not only execute a rotational motion, but simultaneously also moves back and forth translationally in the axial direction, i.e., in the direction of the screw shaft. The motion sequence is thus preferably characterized in that the screw shaft executes an oscillatory motion superimposed on the rotation, when viewed in the axial direction. This motion sequence enables the introduction of internals, namely kneading elements, such as kneading bolts or kneading cogs, into the housing of the feeding and mixing device. Due to the presence of the kneading bolts or the kneading cogs, the screw arranged on the main shaft, the so-called shaft rod, does not run continuously—as seen in the cross-section of the shaft rod—but is subdivided into a plurality of individual blade elements, which each extend over a certain angular sector of the cross-sectional circumference of the shaft rod. Adjoining blade elements are spaced apart from each other both in the axial direction as well as in the exterior circumferential direction of the shaft rod, i.e., in each case, a gap is provided between adjoining blade elements both in the axial direction as well as in the exterior circumferential direction of the shaft rod. For example, if the entire shaft rod of the screw shaft or an axial section of the shaft rod of the screw shaft, in relation to the cross-sectional circumference, comprises three blade elements, which each extend over an angular sector of for example 100° of the cross-sectional circumference of the shaft rod, one is referring to a three-bladed screw shaft or a three-bladed screw shaft section. The rotation and the translational motion of the screw shaft in the axial direction are controlled in such a manner that the individual blade elements with their flanks get close to the corresponding kneading elements to compress the material to be mixed and kneaded and to exert a shearing action on it to thus facilitate the mixing and/or kneading process without the kneading elements colliding with the blade elements. Besides that, the kneading elements come so close to the blade elements that the kneading elements prevent deposits of mixture components on the flanks of the blade elements, so that the kneading elements ultimately also lead to a cleaning of the blade elements. Naturally, the number and the geometry of the blade elements must be adjusted to the number of the kneading elements. Conventionally, the individual kneading elements are arranged on the interior circumferential surface of the housing of the feeding and mixing device—in the axial direction—in multiple rows matched to the geometry and number of the blade elements and extending over at least one section of the inner circumferential surface of the housing. For example, if four rows of kneading elements are arranged on the inner circumferential surface of the housing, the screw shaft can have on its outer circumferential surface—as seen cross-sectionally—four blade elements, between which in each case a sufficiently wide space is provided so that the kneading elements can move through these spaces.

As explained, on the downstream end—when viewed in the conveying direction—of the feeding and mixing device of the mixing and kneading machine, there is arranged a discharge device to convey the homogeneous mixture produced in the feeding and mixing device for further processing out of the feeding and mixing device and for example into an additional processing device, such as a granulation device. To connect the housing of the feeding and mixing device to the discharge device, a connecting element is typically arranged on the downstream front-side end of the housing of the feeding and mixing device—when viewed in the conveying direction. Generally, the connecting element is a flange. The purpose of the connecting element is to connect together the downstream end of the housing and the input side of the discharge device in such a manner that the mixture can be conveyed out of the feeding and mixing device into the discharge device in such a manner that said mixture can be conveyed further there, without said mixture being damaged in the transfer by mechanical or thermal influences. To this end, the screw shaft arranged in the housing of the feeding and mixing device extends all the way through the connecting element to convey the mixture through the connecting element directly to the discharge device.

In the known mixing and kneading machines, the mixture or melt produced in the feeding and mixing device is degassed prior to being transferred into the discharge device to remove from the mixture or melt contained gases and other volatile components, such as residual moisture and monomers. In one variant of known mixing and kneading machines, there is provided for this purpose a degassing device on the downstream end—when viewed in the conveying direction—of the housing of the feeding and mixing device, said degassing device applying a negative pressure to the melt or the mixture (if no melt is produced) to thereby draw off the volatile components from the melt or the mixture (if no melt is produced). However, this has several disadvantages, particularly with regard to thermally sensitive melts or mixtures. On the one hand, kneading elements can then no longer be used downstream of the degassing device, i.e., in the very last section of the housing and in the connecting element, since otherwise too much energy would be introduced into the already degassed melt or mixture (if no melt is produced), which would result in a temperature increase of the melt and for this reason in thermal damage to the degassed melt. For this reason, kneading elements are no longer provided in the known mixing and kneading machines of this variant in the housing section positioned downstream of the degassing device and particularly not in the connecting element, which results in the fact that the downstream region of the feeding and mixing device, in which kneading elements are no longer provided, is at least largely lost when it comes to blending the components of the mixture and homogenizing the mixture. Instead, it hereby only involves just a conveying section. Another disadvantage of this variant is that the mixture to be degassed must be present as a melt or the mixture (if no melt is produced) already prior to entry into the discharge device, namely already upstream of the connecting element in the housing section in which the degassing device is provided, since otherwise no effective degassing is possible. This also results in that the part of the feeding and mixing device of the mixing and kneading machine, downstream from the degassing device and passed through by the screw shaft, can only be used just as a conveying section. In addition, the melt in the downstream connecting element—despite the absence of kneading elements—is further sheared, which can lead to an increase of the melt temperature or even to thermal damage of the melt, such as for thermally sensitive materials in particular, such as polyvinyl chloride (PVC). Besides that, with this variant a complete cleaning of all flanks of the blade elements of the screw shaft is not possible due to a lack of kneading elements in the connecting element. This results in deposits on the flanks of the blade elements and at the transition of the blade elements to the shaft rod. This in turn results in the rinsing times for the mixing and kneading machine being long and the quantity of waste material being substantial when changing the starting materials, since the "self-cleaning effect" achieved by the kneading bolts is absent. Often the entire feeding and mixing device of the mixing and kneading machine must be opened and cleaned to prevent waste if rinsing cannot be successfully applied or to first even make the change of starting materials possible.

In another variant of the known mixing and kneading machines, between the connecting element of the feeding and mixing device and the discharge device, there is provided a degassing dome, with regard to which the mixture, after being discharged from the feeding and mixing device, is introduced from the top into a cylindrical tower and inside of it falls downward on to the screw of the discharge device. However, this variant is poorly suited or not at all suited for processing the melt. Besides that, the screw of the discharge device must be dimensioned to be very large to convey all the material falling out of it into the degassing dome. This results in high investment costs for this variant.

Based on this, the object of the present invention is instead to provide a suitable mixing and kneading machine for continuous preparation processes, such as in particular for manufacturing granulate, extruded profiles or molded parts, such as polymer granulate, polymer extruded profiles or polymer molded parts, said machine allowing an optimal mixing and homogenizing of the mixture components given a minimal length of the feeding and mixing device, so that the mixing and kneading machine is distinguished by optimal efficiency in relation to the length of the feeding and mixing device, and which also makes self-cleaning of the feeding and mixing device easier when changing the starting materials used in the mixing and kneading machine.

According to the invention, this object is achieved by a mixing and kneading machine for continuous preparation processes, such as in particular for manufacturing granulate, extruded profiles or molded parts, such as polymer granulate, polymer extruded profiles or polymer molded parts, having a feeding and mixing device and having a discharge device, in which the feeding and mixing device comprises a housing, a screw shaft and a connecting element, wherein the connecting element is arranged on a front 15 side of the housing and is also connected to the discharge device, wherein a hollow interior is designed in each case in the housing as well as in the connecting element, and the screw shaft extends at least sectionally in an axial direction through the interior of the housing as well as at least sectionally in an axial direction through the interior of the connecting element, wherein there are provided in the housing a plurality of kneading elements, which extend from the inner circumferential surface of the housing into the interior, and wherein the mixing and kneading machine is characterized in that also arranged on the inner circumferential surface of the connecting element are kneading elements, which extend into the interior of the connecting element, and the discharge device has a degassing device.

This solution is based on the knowledge that by first arranging the degassing device on the discharge device instead of on the downstream end, as viewed in the conveying direction, of the housing of the feeding and mixing device, the melt or mixture (if no melt is produced) must first be formed further downstream so that the kneading elements can also be arranged on the inner circumferential surface of the connecting element, without even thermally sensitive materials of the mixture processed therein, such as PVC, being thermally damaged. In the mixing and kneading machine according to the invention, degassing no longer occurs in the region of the quickly rotating and oscillating screw shaft in the feeding and mixing device, but in the discharge device, in other words downstream of the quickly rotating and oscillating screw shaft in the feeding and mixing device. By also arranging kneading elements to the inner circumferential surface of the connecting element, this region of the feeding and mixing device is also available for blending the mixture components and for homogenizing the mixture, so that the length of the feeding and mixing device can be correspondingly shortened to still achieve the same mixing and homogenization level as for a correspondingly longer feeding and mixing device, in which the connecting element has no kneading elements. In this way, not only are the investment costs of the mixing and kneading machine substantially decreased, but also the operating costs in particular, since the feeding and mixing device experiences less wear and has a smaller space requirement due to its smaller overall length. As explained, with regard to the mixing and kneading machine according to the invention, when a melt or mixture (if no melt is produced) has to be processed, it is also sufficient that the melt or mixture (if no melt is produced) is first formed at the downstream, when viewed in the conveying direction, of the connecting element. This also contributes to the fact that, given the same mixing and homogenization level, the overall length of the feeding and mixing device of the mixing and kneading machine can be significantly decreased. Besides this, the mixing and kneading machine according to the invention allows for complete cleaning of all flanks of the blade elements of the screw shaft all the way to their downstream end, due to kneading elements also being provided in the connecting element. In this way, deposits on the flanks of the blade elements and at the transition of the blade elements to the shaft rod of the screw shaft are also reliably prevented in the connecting element. This also results in the rinsing times for the mixing and kneading machine being dramatically shortened when changing the starting materials. All in all, the present invention provides a suitable mixing and kneading machine for continuous preparation processes, such as in particular for manufacturing granulate, extruded profiles or molded parts, such as polymer granulate, polymer extruded profiles or polymer molded parts, which enables optimal blending and homogenizing of the starting materials of the mixture given a minimal length of the feeding and mixing device so that the mixing and kneading machine is distinguished by optimal efficiency in relation to the length of the feeding and mixing device, and which also makes cleaning of the feeding and mixing device easier when changing the components used in the mixing and kneading machine.

According to a particularly preferred embodiment of the present invention, the discharge device is a preferably counter-rotating double-screw extruder. With a double-screw extruder, chambers are formed between the screws when both screws rotate, with the mixture in the discharge device being conveyed forward through said chambers. This is because the screw flights and the shaft rods of the screws of double-screw extruders are designed corresponding to each other and arranged in an intermeshing manner in such a manner that when the two screws rotate, chambers form that wander between the screw flights and the corrugated rods of the two screws in the conveying direction. This results in a forced conveyance that allows the two screw to slowly rotate and still convey the mixture reliably through the discharge device so that only a minimal backflow of part of the mixture opposite the conveying direction occurs. Due to the slow rotation of the two screws, the mixture in the discharge device, in other words in the degassing region, has a comparatively long hold time and large degassing surface so that efficient degassing is achieved without high shear forces being brought into the mixture. In this way thermal damage to the mixture is reliably prevented. Thus, the degassing device moved in the discharge device works synergistically together with the preferred design of the discharge device as a counter-rotating double-screw extruder. Another advantage of the double-screw extruder is that deposits of mixture components are significantly decreased compared to a single-shaft extruder, since the screw flights on the double-screw extruder intermesh.

In this regard, particularly good results are achieved when the discharge device is a counter-rotating double-screw extruder. These have the advantage of a high pressure buildup capability of 250 to 300 bar on a 2 to 3 D screw length (thus, on a length corresponding to two or three times the screw shaft diameter) while simultaneously exhibiting a minimal temperature increase of the melt or mixture (if no melt is produced). By contrast, unidirectional double-screw extruders rotate quickly, which is why these exert higher shear forces and build up significantly less pressure than counter-rotating double-screw extruders.

The screws of the counter-rotating double-screw extruders can be arranged parallel to each other.

In a development of the inventive idea, it is proposed that the two screws of the double-screw extruder are arranged, when viewed in an axial direction, inclined toward each other at an angle of 0.1 to 10°, preferably 0.5 to 7.5°, more preferably 2 to 5° and most preferably 2 to 3°, wherein preferably the two screws converge in the conveying direction. In this embodiment, the thread depth can be designed to be decreasing or homogeneous over the screw length in the conveying direction. In such a design of the screws of the double-screw extruder, the chambers formed between the two screws when operating the discharge device become successively smaller in the conveying direction or the volume of these chambers decreases. The mixture conveyed in the chambers is increasingly compressed in the conveying direction so that volatile compounds, such as in particular gas, residual moisture and monomers, remaining in the mixture are pressed opposite the conveying direction of the discharge device, thus toward the degassing device. This supports degassing in a decisive manner so that the synergistic interaction of the degassing device moved into the discharge device is even further increased by the design of the discharge device as a double-screw extruder.

According to another preferred embodiment of the present invention, it is provided that the screws of the discharge device run conically, wherein the screws taper in the conveying direction. This supports the effect of the aforementioned embodiment, in which the two screws of the double-screw extruder are arranged, not parallel, but at an angle to each other, when viewed in an axial direction.

To achieve a space-saving and significantly shortened mixing and kneading machine, in terms of length of the overall machine, it is proposed in a development of the inventive idea to twist the two screws (in relation to their axial longitudinal direction) of the discharge device in the horizontal plane in relation to the screw shaft of the feeding and mixing device by 45° to 135°, preferably by 60° to 120°, more preferably by 80° to 100°, even more preferably by 85° to 95° and most preferably by 90° so that the front-side end of the screw shaft extending into the connecting element is oriented toward the outer circumferential surfaces of the screws of the discharge device. The discharge device is thereby arranged at right angles to the feeding and mixing device. Besides the space saving achieved thereby, this embodiment has the advantage that the mixture produced in the feeding and mixing device can be conveyed by the screw shaft from the connecting element end opposite the housing of the feeding and mixing device directly between the two screws of the discharge device. An effective transition of the mixture from the feeding and mixing device into the discharge device is thereby achieved, which ensures that mixture components do not get deposited on other components or bake on there. By the degassing device being arrangeable on the opposite side of the discharge device, degassing can also occur directly upon entry of the mixture into the discharge device.

As explained, kneading elements are also arranged on the inner circumferential surface of the connecting element of the feeding and mixing device, which extend into the interior of the connecting element and there with the blade elements arranged on the shaft rod not only cause optimal blending and homogenization of the mixture conveyed by the screw shaft, but in particular prevent a depositing or a baking-on of mixture components on the flanks of the blade elements and in particular at the transition of the flanks of the blade elements to the outer circumferential surface of the shaft rod. Preferably, the kneading elements extend—when viewed in the axial direction of the connection element—deep into the connecting element to thereby best use the length of the connecting element for blending and homogenizing the mixture. In addition, it is preferred that the kneading elements are arranged on the inner circumferential surface of the connecting element in at least two rows extending in the axial direction over at least one section of the inner circumferential surface of the connecting element to thus allow use of a multi-bladed screw shaft section in the connecting element. Preferably, the clearance from the first to the last kneading element covers at least one row in the connecting element at least 50%, preferably at least 70%, more preferably at least 80%, even more preferably at least 90% and most preferably the entire axial length of the inner circumferential surface of the connecting element. Preferably, the distances from the first to the last kneading element cover all rows in the connecting element at least 50%, preferably at least 70%, more preferably at least 80%, even more preferably at least 90% and most preferably the entire axial length of the inner circumferential surface of the connecting element.

In one embodiment, the invention provides a mixing and kneading machine (10) for continuous preparation processes, having a feeding and mixing device (12) and having a discharge device (14), wherein the feeding and mixing device (12) comprises a housing (18), a screw shaft (34) and a connecting element (24), wherein the connecting element (24) is a flange being connected on to the downstream end of the front side of the housing (18) and including a distal radial flange connected to the discharge device (14), wherein a hollow interior is formed in the housing (18) as well as in the connecting element (24), and the screw shaft (34) extends at least sectionally in the axial direction through the interior of the housing (18) as well as at least sectionally in an axial direction through the interior of the connecting element (24), and wherein there are arranged in the housing (18) a plurality of kneading elements (40), which extend from the inner circumferential surface of the housing (18) into the interior,
characterized in that there are arranged on the inner circumferential surface of the connecting element (24) kneading elements (40), which extend into the interior of the connecting element (24) and into the distal radial flange, and the discharge device (14) has a degassing device (26).

Within the meaning of the invention, a row extending in the axial direction of the connecting element or the housing of the feeding and mixing device of the mixing and kneading machine over at least one section of the inner circumferential surface of the connecting element or the housing refers to the fact that a connecting line laid over the kneading elements spaced apart from each other in an axial direction is at least essentially a straight line, wherein the maximum deviation of the connecting line from a straight line is less than 10°, preferably less than 5° and more preferably less than 2° in relation to the cross-section circumference of the inner circumferential surface of the connecting element or the housing of the feeding and mixing device of the mixing and kneading machine.

According to another preferred embodiment of the present invention, it is provided that the kneading elements are also arranged on the inner circumferential surface of the housing in at least two rows extending in the axial direction over at least one section of the inner circumferential surface of the housing. The rows of kneading elements on the inner circumferential surface at least of the downstream end of the housing can thereby align with the rows of kneading elements on the inner circumferential surface of the connecting element if the same screw shaft blade geometries are used in both sections. However, this is not required, since for example in the downstream end of the housing, a three-bladed screw shaft section can be used and a four-bladed screw shaft section can be used in the connection or vice versa.

Usually the feeding and mixing devices of the mixing and kneading machine described here are subdivided into various process sections, wherein in every process section the screw shaft is occupied according to the task assigned to the process section during its operation with a corresponding number or geometry of blade elements and the housing wall inner circumferential surface is occupied with a number of kneading elements adjusted to that. For example, it is known to design the screw shaft sectionally in a three-bladed manner and sectionally in a four-bladed manner, and accordingly to equip corresponding sections of the housing inner wall of the mixing and kneading machine with three or four rows of kneading elements. Depending on whether a process section extends over the downstream end of the housing and the upstream region of the connecting element of the feeding and mixing device or a process section ends at the downstream end of the housing and the next process section begins at the upstream region of the connecting element, the rows of the kneading elements on the inner circumferential surface at least of the downstream end of the housing align with the rows of the kneading elements on the inner circumferential surface of the connecting element or not.

Preferably, 2 to 8, more preferably 2 to 6 and most preferably 2, 3, 4 or 6 rows of kneading elements extending in the direction of the inner circumferential surface of the connecting element are arranged on the inner circumferential surface of the connecting element. Furthermore, it is preferred that 2 to 8, more preferably 2 to 6 and most preferably 2, 3, 4 or 6 rows of kneading elements extending in the axial direction of the inner circumferential surface of the connecting element are arranged on the inner circumferential surface of the housing. Not all sections of the housing must thereby have the same number of rows, as viewed in the axial length of the housing. Instead, individual sections of the housing may have a varying number of kneading elements, wherein however preferably all sections have 2 to 8, more preferably 2 to 6 and most preferably 2, 3, 4 or 6 kneading elements.

To effectively also mix and homogenize the mixture in the region of the connecting element and to enable an effective transfer of the mixture from the feeding and mixing device into the discharge device, it is proposed in a development of the inventive idea that the screw shaft extends—from the front side of the housing at which the connecting element is arranged on the housing, viewed in an axial direction—over at least 50%, preferably at least 70%, more preferably at least 80%, even more preferably at least 90% and most preferably over the entire axial length of the of the connecting element.

As explained, it is provided according to the invention that degassing does not occur in the downstream end of the housing of the feeding and mixing device of the mixing and kneading machine, but first in the discharge device. Therefore, it is provided according to the invention that the connecting element and at least the housing region, which borders at least the connecting element and which extends over at least 20%, preferably at least 40%, more preferably at least 60% and most preferably over the entire axial length of the of the connecting element, does not have any degassing device. This makes it possible—as a function of the specific application—for an additional degassing device to be present in the upstream region of the housing, which is not preferred, however.

Accordingly, it is very particularly preferred that the entire feeding and mixing device has no degassing device.

As explained, the mixing and kneading machine according to the invention is suited in particular for producing granulate, polymer extruded profiles or polymer molded parts. Therefore, it is preferred that in the mixing and kneading machine on the discharge end of the discharge device, in other words on the downstream end of the discharge device, when viewed in the conveying direction, there is arranged a device, which is selected from the group that consists of granulation devices, filters, cutting devices, strand dies, profile tools, sheet dies and combinations thereof. This enables the homogeneous mixture, such as a homogeneous polymer melt in particular, produced in the feeding and mixing device and discharged by the discharge device to be processed into polymer granulate, polymer extruded profiles or polymer molded parts.

Preferably, an underwater granulation device or a strand granulation device is arranged on the discharge end of the discharge device. The air/water granulation device may consist for example of a die body having a heated granulation die plate, a granulation cutter and cutter drive as well as a granulate collection housing having an air, air/water-mist or water connection. Such a granulation device is suited in particular for PVC, elastomers and other high-viscosity melts or highly filled polymer formulations. Alternatively, on the discharge end of the discharge device, there is arranged as a granulation device an underwater granulation device, which comprises a die plate and a water bath adjoining it. An underwater granulation device is suited in particular for tacky and/or low-viscosity melts. Alternatively, on the discharge end of the discharge device, there is arranged as a granulation device a strand granulation device, which comprises for example a strand die, a water bath and a strand granulator having intake rollers and cutter rollers. A strand granulation device is suited in particular for low-viscosity melts.

Alternatively, on the discharge end of the discharge device, there may also be arranged an intermittent cutting device, strand die, sheet die, profile tool or similar device.

With regard to the design of the degassing device, the present invention is not limited. Accordingly, all degassing devices can be used, which can be connected to the discharge device of a mixing and kneading machine. Preferably, the degassing device has a device for generating negative pressure. Alternatively, the degassing device may also be connected to a device for generating positive pressure.

For example, it has proven to be suitable that the degassing device of the discharge device has an opening in the discharge housing, a degassing dome, a vacuum unit connected to the degassing dome, a separator connected to the degassing dome, optionally a leaked air valve, optionally one or more sight glasses and optionally a negative pressure indicator. Both the separator as well as the vacuum unit may be present two or more times. A vacuum pump is preferably used as a vacuum unit. For example, dry running pumps (such as Roots compressors, side channel compressors, claw pumps, and so on) or water ring pumps are suitable as vacuum pumps. In the event that there is a need to suction large quantities of gas and/or liquid and/or in the event that a comparatively low final pressure of less than 50 mbar is to be set, preferably two or more vacuum pumps connected in series are used.

The degassing device can thereby be designed as a flow-through system or as a circulatory system. The flow-through system may comprise for example the degassing dome having a connection hose, a separator, a vacuum pump and a fresh water supply, wherein the fresh water supply may be composed of a water connection, a flow monitor, a 2/2 magnetic valve and a throttle valve for adjusting the water quantity. The circulatory system as a system with open circulation may comprise for example the degassing dome having a connection hose, a separator, a vacuum pump and a vessel having a heat exchanger. The vacuum pump suctions water out of the vessel and conveys the water and any components extracted out of the mixture back into the vessel. The water in the vessel is cooled by means of a heat exchanger. The water level in the vessel is monitored and water is added again if applicable. A pressure-less overflow is provided so that the vessel cannot be overfilled.

In a development of the inventive idea, it is proposed to design the degassing device in such a manner that it can adjust and maintain in the discharge device an absolute pressure of less than 800 mbar, more preferably less than 600 mbar, even more preferably from 50 to 500 mbar and most preferably from 200 to 400 mbar.

An additional subject matter of the present invention is a method for producing granulate, extruded profiles or molded parts, such as polymer granulate, polymer extruded profiles or polymer molded parts, which is performed in a previously described mixing and kneading machine.

The present invention is described in more detail below with reference to the drawing, in which.

Figure 1:
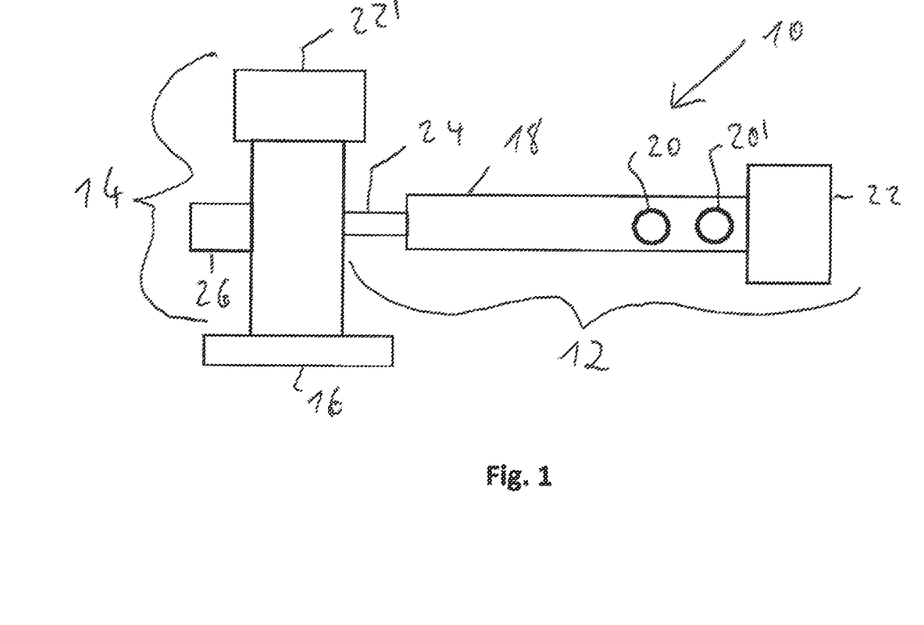
FIG. 1 shows a schematic plan view of a mixing and kneading machine according to the present invention.

The mixing and kneading machine 10 according to the present invention shown in FIG. 1 as a schematic plan view comprises a feeding and mixing device 12, a discharge device 14 as well as an underwater granulation device 16. The feeding and mixing device 12 comprises a housing 18, on the top side of which are arranged a top feeder 20 as well as a filling hopper 20' for supplying the starting materials to be mixed and kneaded. The feeding and mixing device 12 is shown in detail in a perspective view in a folded-open form in FIG. 2 and the downstream end—when viewed in the conveying direction—of the feed and mixing device 12 is shown in a cross-section in FIGS. 3 and 4. On the upstream end of the housing 18, there is arranged a drive block 22, which comprises a motor as well as a gearbox. In addition, the housing 18 comprises a connecting element 24 flanged on to the downstream end of the housing front side. According to the invention, a degassing device 26 is provided on the discharge device 14, specifically on the side of the discharge device 14 opposite the connecting element 24. Furthermore, the discharge device 14 also comprises a drive block 22'.

Figure 2:
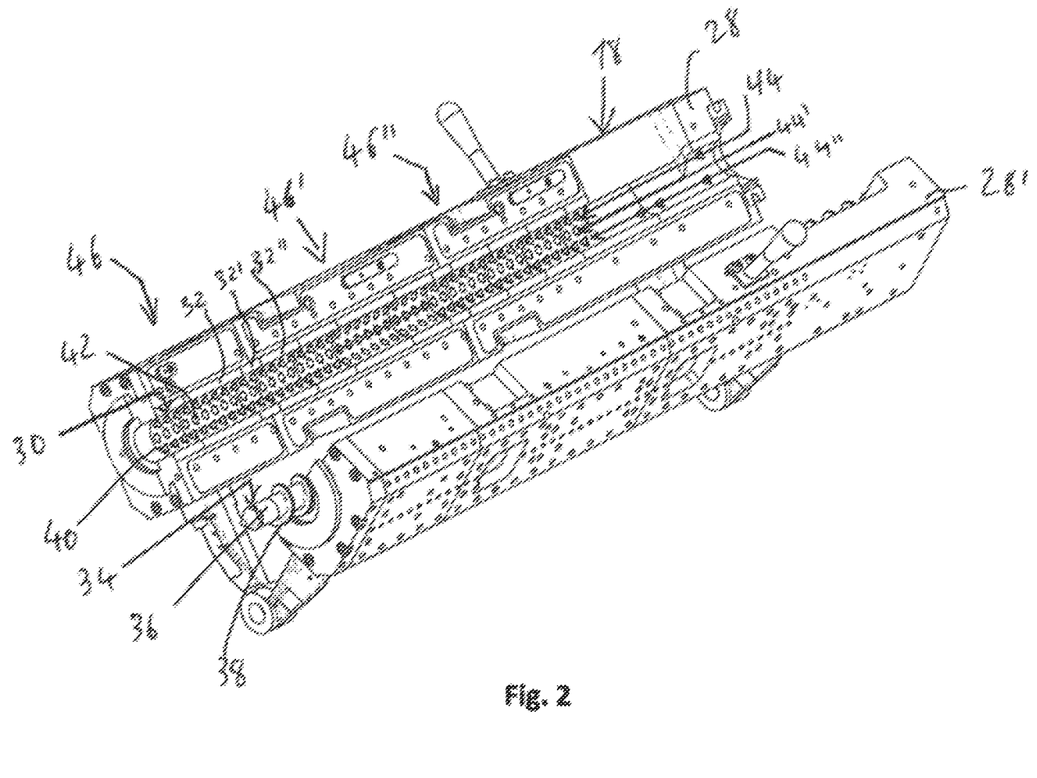
FIG. 2 shows a perspective view of the housing with a utilized screw shaft of the feeding and mixing device of the mixing and kneading machine shown in FIG. 1.
Figure 3:
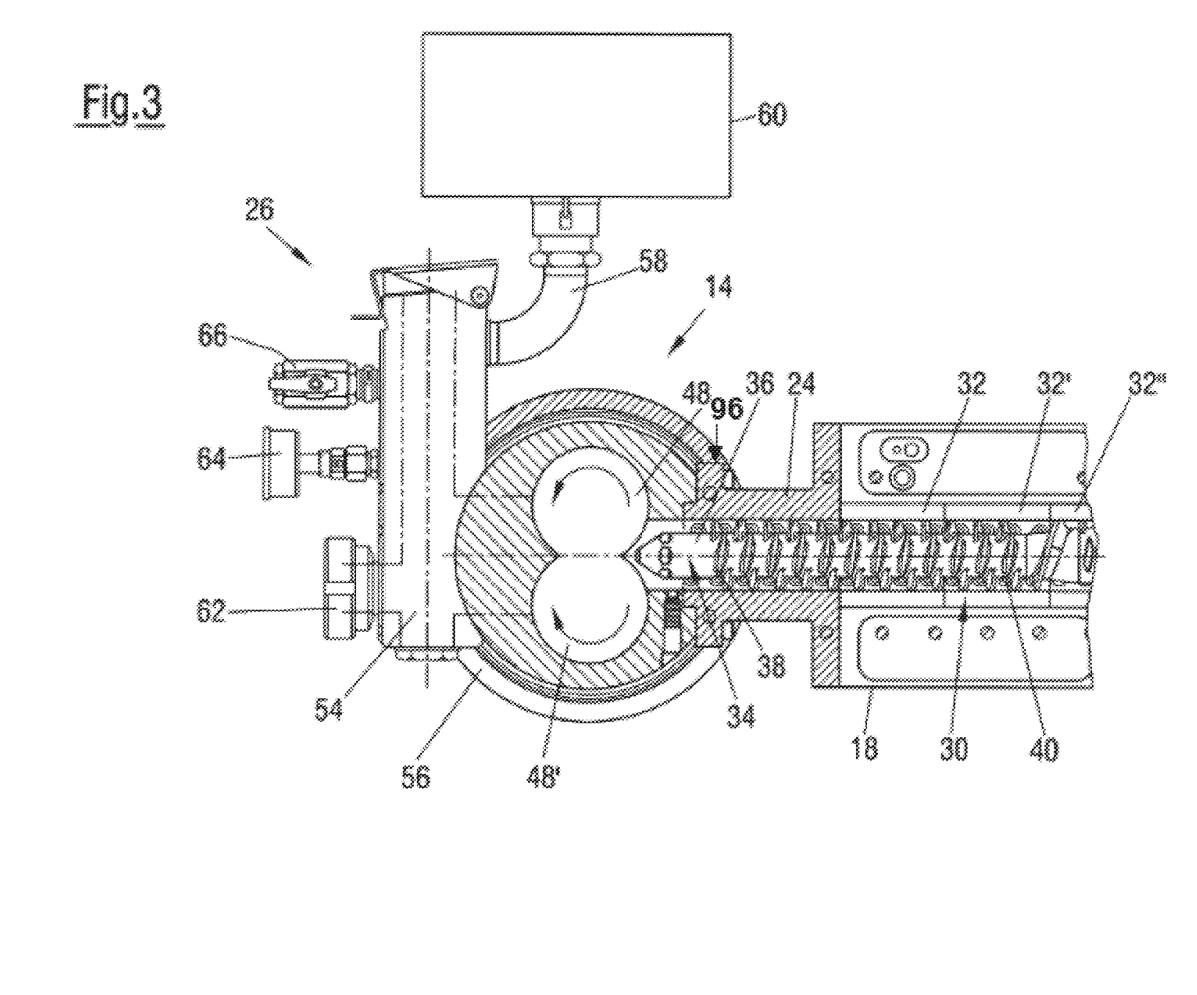
FIG. 3 shows a schematic cross-section of a section of the downstream part of the feeding and mixing device as well as the discharge device of the mixing and kneading machine shown in FIG. 1.
Figure 4:
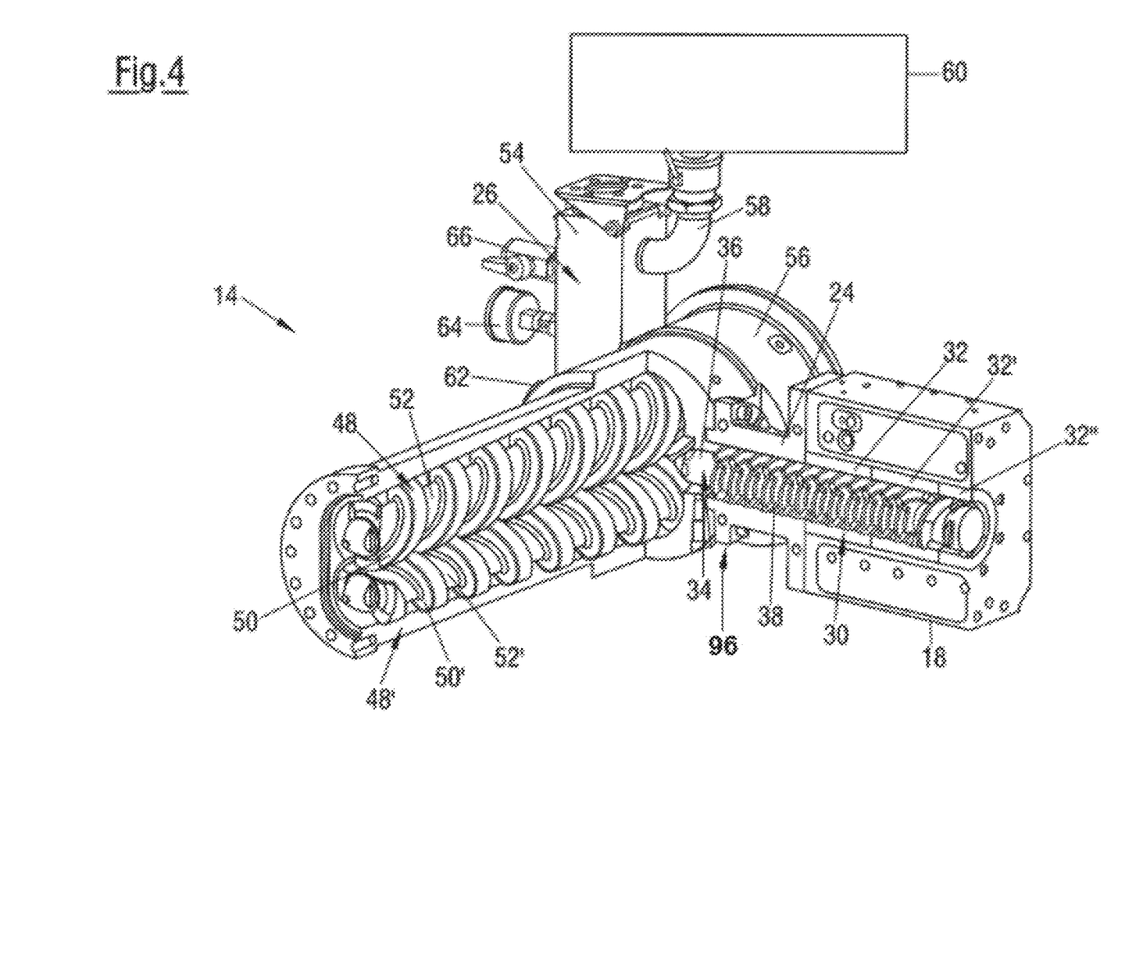
FIG. 4 shows a perspective and partially section view of the downstream part of the feeding and mixing device of the mixing and kneading machine shown in FIG. 1.

As shown in a detailed manner in FIGS. 2 to 4, the housing 18 comprises two housing halves 28, 28', which are clad inside with a so-called housing shell 30, which is composed of multiple housing shell parts 32, 32', 32" arranged in an axially adjoining manner. In the present patent application, the housing shell 30 is thereby considered to be part of the housing 18. When the two housing halves 28, 28' are closed, the inner circumferential surface of the housing 18 borders a cylindrical hollow interior, in which a screw shaft 34 is arranged. The screw shaft 34 comprises a shaft rod 36, on whose circumferential surface blade elements 38 are arranged. Kneading elements 40, which are designed as kneading bolts 40, are provided on the inner circumferential surface of the two housing halves 28, 28'. Each of these kneading elements is arranged for fixing a hole provided in each case in the wall of the housing 18, said hole extending from the inner circumferential surface of the housing shell 30 through the wall of the housing 18. The lower, radial inner end of each recess 42 can be designed having a square cross-section, wherein each kneading bolt 40 has an end fitting perfectly into the square-designed radial inner end of the receptacles 42 and is thereby fixed in the utilized state in a non-rotatable manner in the receptacle 42. The kneading bolt 40 is connected on its end lying in the receptacle 42 to a fixing element used in the overlying end of the receptacle 42 by means of screwing. As one can see particularly in FIG. 2, the kneading bolts 40, each evenly spaced apart from each other, extend into each of the two housing halves 28, 28', when viewed in the axial direction, in the form of three rows 44, 44', 44". The housing 18 is preferably temperature-controlled by means of one or more thermo-devices or heatable using electric heat cartridges or heating plates attached outside on the housing, and is water- or air-cooled, if necessary also cooled by a different fluid, such as an oil or another liquid or a special gas.

As FIG. 2 shows, the mixing and kneading machine is subdivided in the axial direction into multiple process steps 46, 46', 46", wherein each process step 46, 46', 46" is adapted to the function of the individual process steps 46, 46', 46" in terms of the number of kneading bolts 40 as well as the number and dimension of the blade elements 38 on the shaft rod 34. As illustrated in FIG. 2, in the left section 46 and in the right section 46" of the upper housing half 28, of the three rows 44, 44', 44" of receptacles 42 for kneading bolts 40, two rows, specifically the upper row 44 and the lower row 44", are furnished with kneading bolts 40, whereas the middle row 44' is not furnished with kneading bolts 40. In contrast, in the middle section 46' of the upper housing half 28, of the three rows 44, 44', 44" of receptacles 42 for kneading bolts 40, one row, specifically the middle row 44', is furnished with kneading bolts 40, whereas the upper row 44 and the lower row 44" are not furnished with kneading bolts 40.

Figure 7:
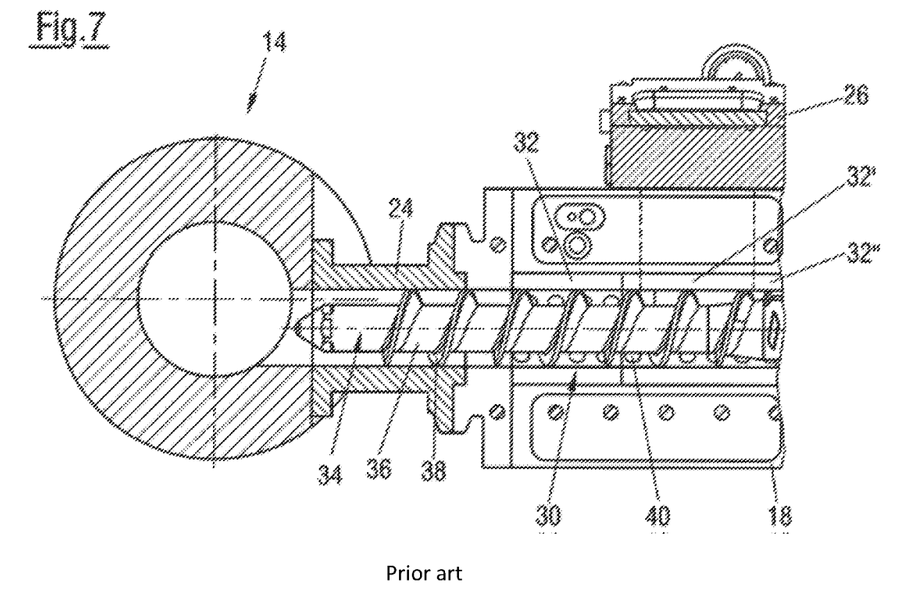
FIG. 7 shows a schematic cross-section of a section of the downstream part of the feeding and mixing device as well as the discharge device of a mixing and kneading machine according to prior art.

As shown in FIG. 7, which depicts a mixing and kneading machine according to prior art, a degassing device 26 is provided in the mixing and kneading machines of this type according to prior art on the downstream end of the housing 18 in order to degas the mixture or melt produced in the feeding and mixing device 12 prior to the transfer into the discharge device 14 to remove gases contained in the mixture or melt as well as other volatile components, such as residual moisture and monomers. Due to the degassing device 26 arranged there, kneading elements 40 are no longer provided in the connecting element 24 of this mixing and kneading machine, since otherwise too much energy would be introduced into the already degassed melt, which would result in a temperature increase of the melt and thus to thermal damage. This results in that the downstream region of the feeding and mixing device 12, in which kneading elements 40 are no longer provided, is largely lost for blending the components of the mixture and homogenizing the mixture. An additional disadvantage of this variant is that the mixture for degassing must be present as a melt already prior to entering into the discharge device, specifically already upstream of the connecting element 24 in the section of the housing 18 in which the degassing device 26 is provided, since otherwise no effective degassing is possible. This also results in that the portion of the feeding and mixing device 12 penetrated by the screw shaft 34 and situated downstream of the degassing device 26 can now only be used just as a conveying section. In addition, a complete cleaning of all flanks of the blade elements 38 of the screw shaft 34 is not possible because of kneading elements 40 being absent in the connecting element 24. This results in deposits on the flanks of the blade elements 38 and on the transition of the blade elements 38 to the shaft rod 36. This in turn leads to longer rinse times for the mixing and kneading machine and a larger quantity of waste material when changing the starting materials.

To overcome these disadvantages, according to the invention, as shown in FIGS. 1, 3 and 4, the degassing device 26 is provided at the discharge device 14 and kneading elements 40 are also arranged on the inner circumferential surface of the connecting element 24, which extend into the interior of the connecting element 24. Thus, in the mixing and kneading machine according to the invention, degassing no longer takes place in the region of the quickly rotating and oscillating screw shaft 34 in the feeding and mixing device 12, but in the discharge device 14, in other words downstream of the quickly rotating and oscillating screw shaft 34 of the feeding and mixing device 12. By first arranging the degassing device 26 on the discharge device 14 instead of on the downstream end of the housing 18 of the feeding and mixing device 12, the melt must first be formed further downstream so that the kneading elements 40 can also be arranged on the inner circumferential surface of the connecting element 24 without even thermally sensitive materials of the mixture processed therein, such as PVC, being thermally damaged. In this way, the length of the feeding and mixing device 12 can be shortened correspondingly, by means of which both the investment costs as well as the operating costs of the mixing and kneading machine 10 are substantially decreased. In addition, besides other advantages, deposits on the flanks of the blade elements 38 and on the transition of the blade elements 38 to the shaft rod 36 of the screw shaft 34, and also in the connecting element 24, are also reliably prevented.

As shown in FIGS. 3 and 4, the discharge device 14 is a counter-rotating double-screw extruder, thus one, which has two screws 48, 48' extending and intermeshing in the longitudinal direction, which when operating the discharge device 14 rotate opposite to each other. The screws 48, 48' have screw flights 50, 50' and shaft rods 52, 52', wherein the screws 48, 48' are designed to correspond to each other and are arranged in an intermeshing manner such that when the two screws rotate, chambers form between the screw flights 50, 50' and the shaft rods 52, 52' of the two screws 48, 48' and wander in the conveying direction. The result is forced conveyance, which allows both screws 48, 48' to rotate slowly and yet still convey the mixture reliably through the discharge device so that there is a minimal backflow of part of the mixture opposite the conveying direction. Due to the slow rotation of the two screws, the mixture in the discharge device 14, in other words in the degassing region, has a comparatively long hold time as well as a large degassing surface so that efficient degassing is achieved without high shear forces being brought into the mixture. Thermal damage to the mixture is thereby reliably prevented.

As one can see in FIG. 4, the two screws 48, 48' of the double-screw extruder, when viewed in an axial direction, are not parallel, but arranged to incline towards each other at an angle of 0.1 to 20°, preferably 0.5 to 10° and more preferably 2 to 5°, wherein the two screws 48, 48' converge in the conveying direction.

As also shown in FIGS. 3 and 4, the degassing device 26 of the discharge device 14 comprises a degassing dome 54, which is connected via an opening (not depicted) to the housing 56 of the discharge device 14. A device 60 comprising a vacuum pump and a separator is arranged on the degassing dome 54 via a hose 58. In addition, the degassing dome 54 comprises a sight glass 62, an indicator 64 for negative pressure as well as a leaked air valve 66. The negative pressure required in the degassing dome 54 is adjusted by the vacuum pump provided in the device 60, whereas residual gas and/or residual liquid is extracted and separated out of the degassing dome 54 by means of the separator provided in the device 60. The device 60 can thereby be designed as a flow-through system as shown in FIG. 5, or as a circulation system as shown in FIG. 6.

Figure 5:
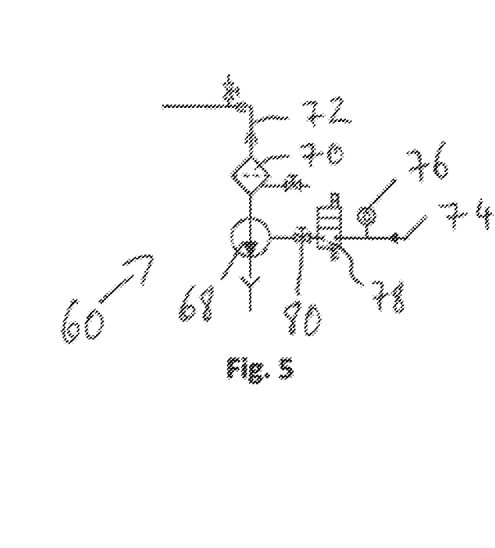
FIG. 5 shows a schematic view of a degassing device section, designed as a flow-through system, comprising a vacuum pump and a separator.

According to an embodiment of the present invention, the device 60 shown in FIG. 5 and designed as a flow-through system comprises a water ring pump as a vacuum pump 68 as well as a separator 70, which are connected to each other via a hose line 72. In addition, the device 60 of this design comprises for fresh water supply purposes a water connection 74, a flow monitor 76, a 2/2 magnetic valve 78 and a throttle valve 80 for adjusting the water quantity.

Figure 6:
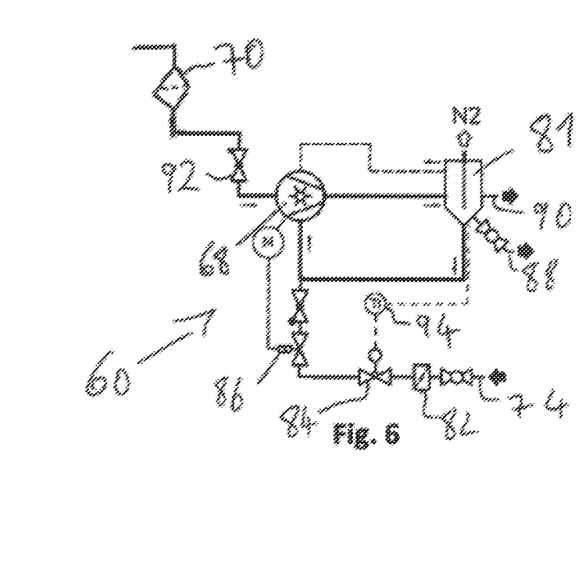
FIG. 6 shows a schematic view of a degassing device section, designed as a circulation system, comprising a vacuum pump and a separator.

According to another embodiment of the present invention, the device 60 shown in FIG. 6 and designed as a circulation system comprises a water ring pump as a vacuum pump 68 as well as a separator 70. In addition, the device 60 of this embodiment comprises a vessel having a heat exchanger 81, for fresh water supply purposes a water connection 74, a strainer 82, a control valve 84, a 2/2 shutoff valve 86, a drain valve 88, an overflow 90, a check valve 92 as well as a temperature regulator 94. The vacuum pump 68 suctions the water out of the vessel 81 and conveys the water and any components extracted out of the mixture back into the vessel 81. The water in the vessel 81 is cooled by the heat exchanger. The water level in the vessel 81 is monitored and if necessary, water is added again. A pressureless overflow 90 is provided so that the vessel 81 cannot be overfilled.

LIST OF REFERENCE SIGNS

10 Mixing and kneading machine
12 Feeding and mixing device
14 Discharge device
16 (Underwater) granulation device
18 Housing
20 Top feeder
20' Filling funnel
22, 22 Drive block
24 Connecting element
26 Degassing device
28, 28' Housing halves
30 Housing shell
32, 32', 32" Housing shell part
34 Screw shaft
36 Shaft rod
38 Blade elements
40 Kneading elements/kneading bolts
42 Receptacle for kneading element
44, 44', 44" Row of kneading elements
46, 46', 46" Process sections
48, 48' Screws of the discharge device
50, 50' Screw flight of a screw of the discharge device
52, 52' Shaft rod of a screw of the discharge device
54 Degassing dome
56 Housing of the discharge device
58 Hose
60 Device comprising a vacuum pump and separator
62 Sight glass
64 Negative pressure indicator
66 Leaked air valve
68 Vacuum pump
70 Separator
72 Hose line
74 (Fresh) water connection
76 Flow monitor
78 2/2 magnetic valve
80 Throttle valve
81 Vessel with heat exchanger
82 Strainer
84 Regulating valve
86 2/2 shutoff valve
88 Drain valve
90 Overflow
92 Check valve
94 Temperature regulator
96 Radial flange

The invention claimed is:

1. Mixing and kneading machine (10) for continuous preparation processes, having a feeding and mixing device (12) and having a discharge device (14), wherein the feeding and mixing device (12) comprises a housing (18), a screw shaft (34) and a connecting element (24), wherein the connecting element (24) is a flange being connected on to the downstream end of the front side of the housing (18) and including a distal radial flange connected to the discharge device (14), wherein a hollow interior is formed in the housing (18) as well as in the connecting element (24), and the screw shaft (34) extends at least sectionally in the axial direction through the interior of the housing (18) as well as at least sectionally in an axial direction through the interior of the connecting element (24), and wherein there are arranged in the housing (18) a plurality of kneading elements (40), which extend from the inner circumferential surface of the housing (18) into the interior,
characterized in that there are arranged on the inner circumferential surface of the connecting element (24) kneading elements (40), which extend into the interior of the connecting element (24) and into the distal radial flange, and the discharge device (14) has a degassing device (26).

2. Mixing and kneading machine (10) according to claim 1, characterized in that the discharge device (14) is a double-screw extruder.

3. Mixing and kneading machine (10) according to claim 2, characterized in that the discharge device (14) is a counter-rotating double-screw extruder.

4. Mixing and kneading machine (10) according to claim 2, characterized in that the two screws of the double-screw extruder, when viewed in an axial direction, are not arranged parallel but are inclined to each other at an angle of 0.1 to 20°.

5. Mixing and kneading machine (10) according to claim 2, characterized in that the screws of the discharge device (14) run conically, wherein the screws taper in the conveying direction.

6. Mixing and kneading machine (10) according to claim 2, characterized in that the screws of the discharge device (14) are twisted in the horizontal plane in relation to the screw shaft of the feeding and mixing device by 45° to 135°, so that the front side end of the screw shaft (34) extending into the connecting element (24) is oriented toward the outer circumferential surfaces of the screws of the discharge device (14).

7. Mixing and kneading machine (10) according to claim 1, characterized in that the kneading elements (40) are arranged on the inner circumferential surface of the connecting element (24) in at least two rows (44, 44', 44") extending in the axial direction over at least one section of the inner circumferential surface of the connecting element (24), wherein the distance from the first to the last kneading element (40) of at least one row covers at least 50% of the inner circumferential surface of the connecting element (24).

8. Mixing and kneading machine (10) according to claim 7, characterized in that the kneading elements (40) on the inner circumferential surface of the housing (18) are also arranged in at least two rows (44, 44', 44") extending in the axial direction over at least one section of the inner circumferential surface of the housing (18).

9. Mixing and kneading machine (10) according to claim 1, characterized in that the screw shaft (34)—when viewed in the axial direction from the front side of the housing (18) to which the connecting element (24) is arranged on the housing (18)—extends over at least 50% of axial length of the connecting element (24).

10. Mixing and kneading machine (10) according to claim 1, characterized in that the connecting element (24) and at least the region of the housing (18) bordering the connecting element (24), which extends over at least 20% of axial length of the housing (18), has no degassing device.

11. Mixing and kneading machine (10) according to claim 10, characterized in that the entire feeding and mixing device (12) has no degassing device.

12. Mixing and kneading machine (10) according to claim 1, characterized in that there is arranged on the discharge end of the discharge device (14) a device, which is selected from the group consisting of granulation devices, filters, cutting devices, strand dies, profile tools, sheet dies and combinations thereof.

13. Mixing and kneading machine (10) according to claim 1, characterized in that the degassing device (26) has a device for generating negative pressure or is connected to a device for generating negative pressure.

14. Mixing and kneading machine (10) according to claim 1, characterized in that the degassing device (26) is designed in such a manner that it can adjust and maintain in the discharge device (14) an absolute pressure of less than 800 mbar.

15. Method for producing granulate, extruded profiles or molded parts which is executed in a mixing and kneading machine according to claim 1.

* * * * *